US010523663B2

United States Patent
Bhullar et al.

(10) Patent No.: US 10,523,663 B2
(45) Date of Patent: Dec. 31, 2019

(54) SHARED PASSWORD PROTECTION WITHIN APPLICATIONS

(71) Applicant: Apple Inc., Cupertino, CA (US)

(72) Inventors: Bicrumjit S. Bhullar, San Jose, CA (US); Markus Hagele, San Francisco, CA (US); Jay C. Capela, Santa Cruz, CA (US); Gustaf Engstrom, San Francisco, CA (US); Timothy I. Mahoney, San Francisco, CA (US); Charles J. Migos, Millbrae, CA (US); William J. Thimbleby, Sunnyvale, CA (US); Michael D. Trent, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 327 days.

(21) Appl. No.: 15/379,376

(22) Filed: Dec. 14, 2016

(65) Prior Publication Data

US 2017/0200001 A1    Jul. 13, 2017

Related U.S. Application Data

(60) Provisional application No. 62/276,935, filed on Jan. 10, 2016.

(51) Int. Cl.
*G06F 21/00* (2013.01)
*H04L 29/06* (2006.01)
(Continued)

(52) U.S. Cl.
CPC ............ *H04L 63/083* (2013.01); *G06F 21/60* (2013.01); *G06F 21/604* (2013.01); *G06F 21/62* (2013.01);
(Continued)

(58) Field of Classification Search
CPC ...... G06F 21/60; G06F 21/602; G06F 21/604; G06F 21/62; G06F 21/6209;
(Continued)

(56) References Cited

U.S. PATENT DOCUMENTS 7,864,987 B2    1/2011    Venkatanna et al.
8,873,814 B2    10/2014   Goel
(Continued)

FOREIGN PATENT DOCUMENTS

WO    2014186882 A1    11/2014

*Primary Examiner* — Edward Zee
(74) *Attorney, Agent, or Firm* — Dickinson Wright RLLP

(57) ABSTRACT

Various techniques are disclosed for managing and modifying data items. In some embodiments, a first data item can be selected for password protection via establishing an active secured user session according to a set of user credentials. Thereafter, subsequent data items can be selected for password protection using the same set of user credentials while the secured user session remains active. In some embodiments, a gesture input can be received by a touch interface. The input can be detected, and when the input is recognized as a command for creating an extension of a work space associated with a data item, then the extension of the work space is generated. In some embodiments, the gesture input received by the touch interface is recognized as a command for creating a new work space associated with the data item such that a new work space is generated upon recognizing the input.

20 Claims, 15 Drawing Sheets

(51) Int. Cl.
*G06F 21/62* (2013.01)
*G06F 21/60* (2013.01)

(52) U.S. Cl.
CPC .... *G06F 21/6209* (2013.01); *H04L 2463/082* (2013.01)

(58) Field of Classification Search
CPC ..... G06F 21/6218; H04L 9/08; H04L 9/0861; H04L 9/088; H04L 9/32; H04L 9/3226; H04L 9/3231
See application file for complete search history.

(56) References Cited

U.S. PATENT DOCUMENTS

| | | | |
|---|---|---|---|
| 8,931,081 B2 | 1/2015 | Celi, Jr. et al. | |
| 9,124,419 B2 | 9/2015 | Bar-El et al. | |
| 2008/0091833 A1* | 4/2008 | Pizano | G06F 21/6245 709/229 |
| 2014/0059669 A1* | 2/2014 | Yuan | G06F 21/60 726/17 |
| 2016/0085981 A1* | 3/2016 | Bruwer | G06F 21/6209 726/28 |
| 2016/0103988 A1 | 4/2016 | Caron et al. | |

\* cited by examiner

SHARED PASSWORD PROTECTION WITHIN APPLICATIONS

CROSS-REFERENCE TO RELATED APPLICATIONS

The present application claims the benefit of U.S. Provisional Application No. 62/276,935, entitled "SHARED PASSWORD PROTECTION WITHIN APPLICATIONS" filed Jan. 10, 2016, the content of which is incorporated herein by reference in its entirety for all purposes.

FIELD

The described embodiments set forth a technique for using a computing device to provide password protection for a data item.

BACKGROUND

The overall inclusion of sensitive information within user files has increased in recent years due to the expanding connectivity and interoperability between computing devices (e.g., via cloud-based storage solutions). Concern over the security of such sensitive information has led to the implementation of traditional authentication and encryption techniques. Although these traditional techniques generally help reduce unauthorized access to privileged information, they are also characterized as being inflexible and burdensome to use, especially in view of the ever-increasing number of user files found on present-day computing devices. For example, it can be inconvenient for a user to change password protection for a large number of files as conventional techniques do not enable for global password protection changes across the files. Consequently, stale authentication information can increase the likelihood of privacy breaches.

SUMMARY

The embodiments described herein set forth techniques for password protecting one or more data items stored within a database.

One embodiment sets forth a method for password protecting a data item. In particular, the method is implemented at a computing device, and includes the steps of (1) receiving a selection of a first data item to be password protected, (2) receiving a password to be associated with the first data item, (3) securing the first data item with the received password, (4) initiating a secured user session, (5) receiving a selection of a second data item to be password protected, (6) determining whether the secured user session is active, and (7) when the secured user session is active: password protecting the second data item with the received password.

Another embodiment sets forth a method for creating an extension of a work space associated with a supplementary data item of a main data item. The method is implemented by a computing device, and includes the steps of (1) receiving a request to provide a supplementary data item, where the supplementary data item includes a work space, (2) receiving a gesture intended for creating an extension of the work space beyond one or more boundaries of the supplementary data item, and (3) determining whether the received gesture corresponds with a pre-established pattern associated with creating the extension of the work space beyond the one or more boundaries of the supplementary data item. When the computing device determines that the received gesture corresponds with the pre-established pattern, then the computing device (4) creates the extension of the work space.

Another embodiment sets forth a method for creating a work space associated with a supplementary data item of a main data item. The method is implemented by a computing device, and includes the steps of (1) receiving a request to provide a supplementary data item, where the supplementary data item includes a work space, (2) receiving a gesture intended for creating an additional work space of the supplementary data item, and (3) determining whether the received gesture corresponds with a pre-established pattern associated with creating the additional work space of the supplementary data item. When the computing device determines that the received gesture corresponds with the pre-established pattern, then the computing device (4) creates the additional work space.

Other embodiments include a non-transitory computer readable medium configured to store instructions that, when executed by a processor, cause the processor to implement any of the foregoing techniques set forth herein.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments

BRIEF DESCRIPTION OF THE DRAWINGS

The included drawings are for illustrative purposes and serve only to provide examples of possible structures and arrangements for the disclosed inventive apparatuses and methods for their application to computing devices. These drawings in no way limit any changes in form and detail that can be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
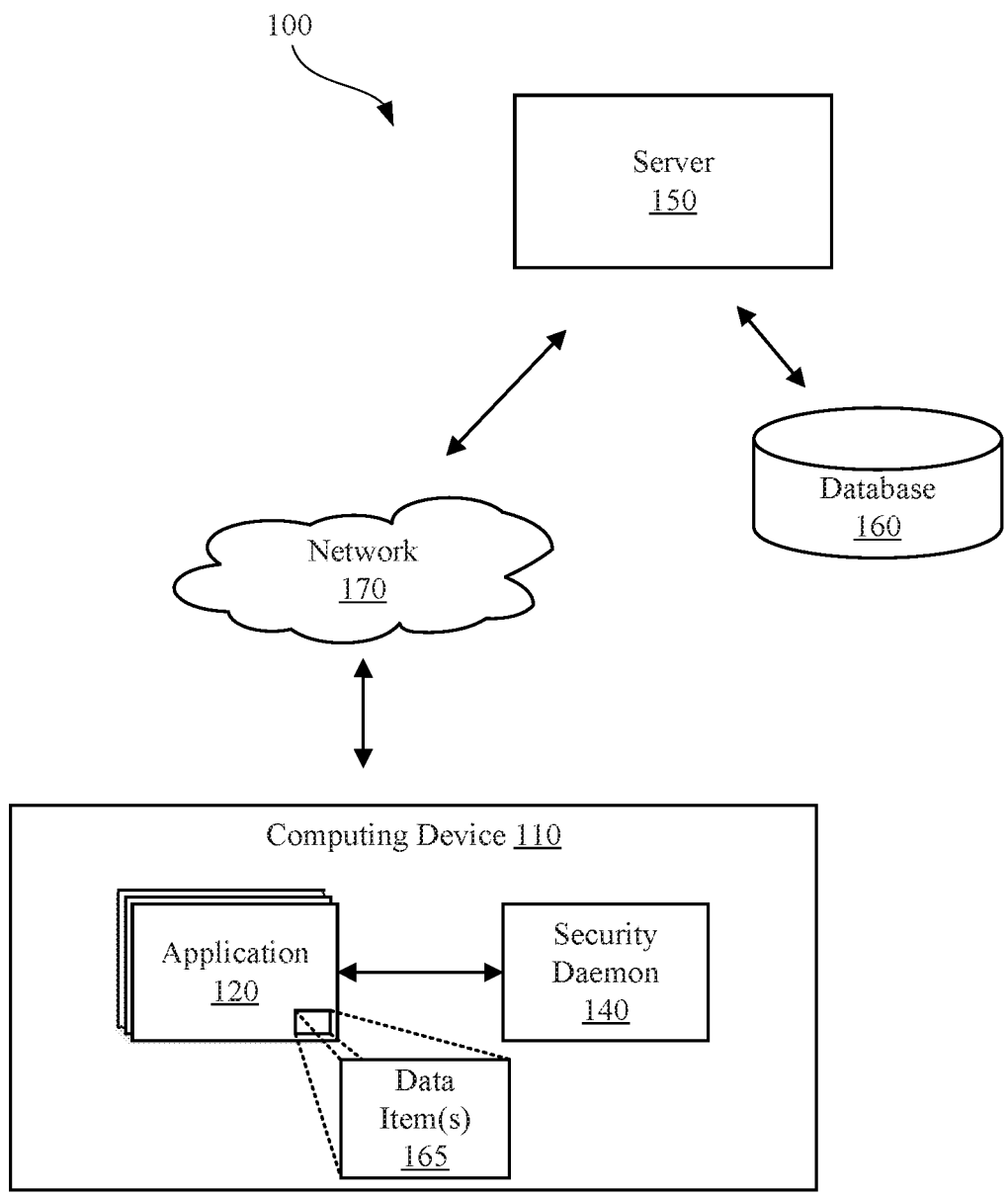
FIG. 1 illustrates a block diagram of different components of a computing device configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for initially password protecting unprotected data items on a computing device, and providing a secured user session for accessing password protected data items.

According to some embodiments, a computing device—specifically, an application executing on the computing device—can be configured to service a request to password protect a particular unprotected data item that is accessible to the application. For example, the particular unprotected data item can be stored within a database that is managed by the application. The particular unprotected data item can represent, for example, a word processing document, a note, a sketch, and the like. As described in greater detail herein, the computing device can receive a selection of the particular unprotected data item to be password protected, and respond by providing a prompt for a password to be associated with the particular unprotected data item. Thereafter, the particular unprotected data item can be encrypted using the password. In some embodiments, the computing device can be configured to activate a secured user session in conjunction with password protecting the particular unprotected data item, which is described below in greater detail.

In some embodiments, initiating a secured user session can enable the application to service requests to password protect other unprotected data items stored within the database without requiring frequent and repetitive input of the password. In other words, so long as the secured user session remains active, it is not necessary for the computing device to prompt the user to provide the password or other authentication credentials (e.g., secondary authentication factors) in order to password protect the other unprotected data items. In addition, while the secured user session remains active, the computing device can enable a user of the application to access (e.g., view, modify, delete, etc.) any number of password protected data items without requiring input of authentication credentials associated with the password protected data items. In some embodiments, the secured user session remains active until the occurrence of at least one of a pre-established period of time has passed, logging out of the secured user session, a network communication to the computing device is disrupted, or power to the computing device is turned off. This approach provides the non-obvious advantage of substantially reducing the necessity for a user to enter authentication credentials each time the user desires to carry out protection-related operations on data items, which can provide a substantial improvement to the user's satisfaction.

Accordingly, the computing device is able to associate a single password with all of the password protected data items in the database. Notably, associating all password protected data items with a single password eliminates the need for the user to remember different passwords for different data items. In some cases, when a user desires to change an existing password, the computing device can carry out a global password change such that the password associated with all password protected data items is converted to a new password. In the event that a user forgets the password associated with the protected data items, the user can request that the password be changed to a new password. In this event, the computing device can retain all data items that are password protected using the password to enable the user to recover these data items at a later time if the password is recalled. At the same time, the computing device can password protect other unprotected data items using the new password.

It is noted that the term "associating" the password/secondary authentication factor with one or more data items can refer to encrypting or encoding the one or more data items, such as by a security daemon, by using the password/secondary authentication factor such that only a user who can provide the password/secondary authentication factor can access the one or more data items. It is also noted that the term "authorized user" (of a data item) refers to an individual or group of individuals who directly or indirectly receive access privileges to access the data item.

Accordingly, the embodiments described herein set forth techniques for providing password protection for one or more data items on a computing device. A more detailed discussion of these techniques is set forth below and described in conjunction with FIGS. 1-12, which illustrate detailed diagrams of systems, methods, and user interfaces that can be used to implement these techniques.

FIG. 1 illustrates a block diagram of different components of a system 100 that is configured to implement the various techniques described herein, according to some embodiments. More specifically, FIG. 1 illustrates a high-level overview of the system 100, which includes a computing device 110 that can represent, for example, a desktop computer, a portable computer, a mobile device (e.g., smartphone), a tablet, and the like. According to some embodiments, the computing device 110 can be configured to execute (e.g., via an operating system installed on the computing device 110) various applications 120 and a security daemon 140. In one example, an application 120 can represent a note-taking program, such as Apple Notes®, produced by Apple®. In other examples, the application 120 represent a multimedia program (e.g., a photo library), a music player, a word processor, and the like. As shown in FIG. 1, the application 120 and the security daemon 140 can be configured to directly communicate with one another. In some embodiments, when password protecting a data item—such as a data item 165 managed by the application 120—the application 120 can request that the security daemon 140 encrypt the data item. The security daemon 140 can be also be configured to authenticate the identity of a user requesting access to a password protected data item by prompting the user for either a password or secondary authentication factor. It is generally noted, however, that it is not necessary for the security daemon 140 to be a separate and distinct software entity within the computing device 110, and that any of the applications 120 can be configured to implement at least a portion of the functionality of the security daemon 140 described herein.

As described in greater detail herein, the application 120 can be configured to initiate a secured user session in association with a password provided by a user, e.g., when a user enters a new password to carry out password protection of a first data item, when a user enters an existing password to view password protected data items, and the like. In other embodiments, the application 120 can be configured to re-activate a secured user session, e.g., by prompting a user to re-input credentials, when it is determined that the secured user session has expired.

As also shown in FIG. 1, the computing device 110 can communicate with a server 150 via a network 170, where the network 170 can represent at least one of a global network (e.g., the Internet), a wide area network, a local area network, and the like. According to some embodiments, the server 150 can be configured to store the data items 165 (e.g., as a primary storage or a backup storage) in a database 160 and enable the computing device 110 to access the data items 165. In some embodiments, the server 150 can also be configured to implement at least some of the techniques carried out by the security daemon 140, which can provide the benefit of offloading responsibilities from the computing device 110.

FIGS. 2A-2B and 3A-3B illustrate exemplary user interfaces for password protecting data items. In particular, these FIGS. illustrate steps for password protecting a first data item, enabling a secured user session, and password protecting a second data item while the secured user session remains active.

Figure 2A:
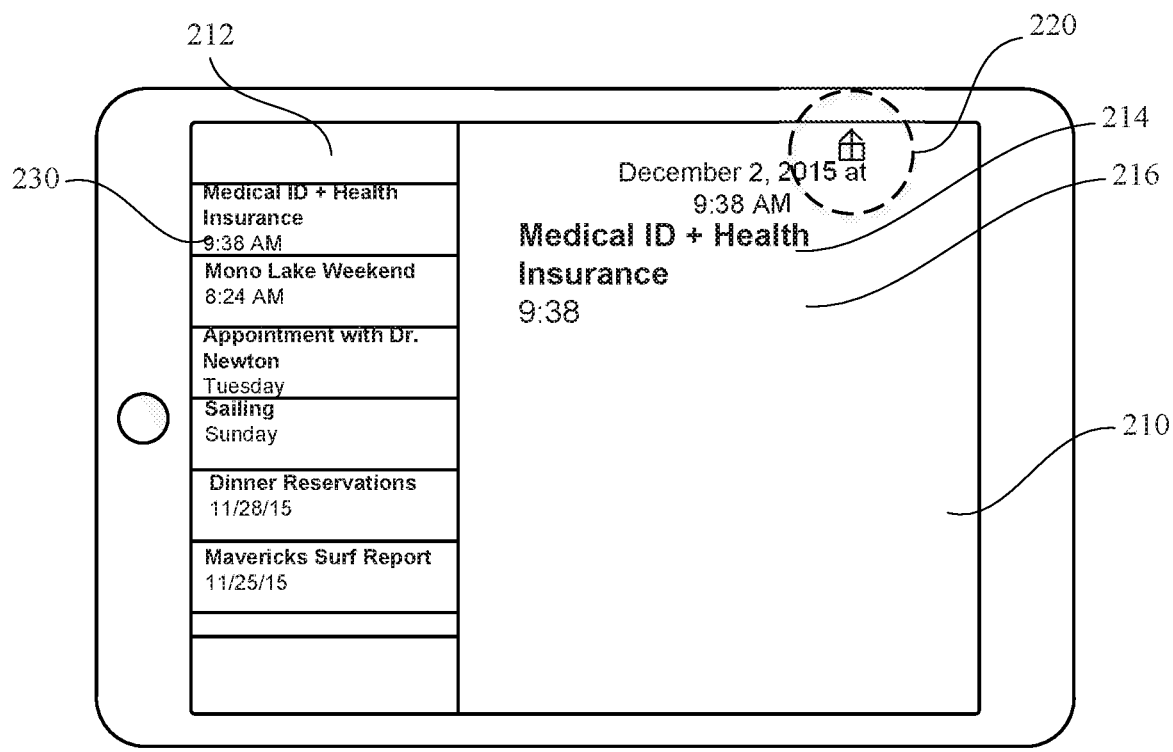
FIGS. 2A-B illustrate an example user interface, according to some embodiments.
Figure 2B:
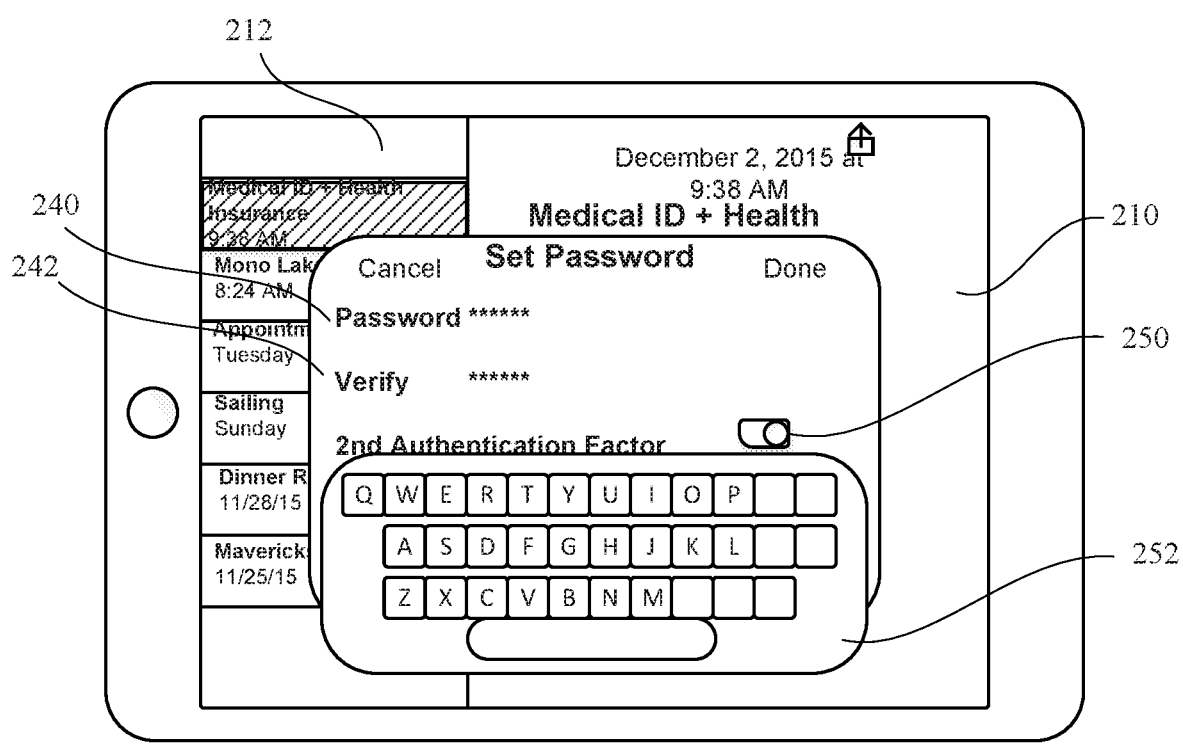

FIG. 2A illustrates an exemplary user interface 210 of an application 120 designed to enable a user to manage notes. As shown in FIG. 2A, the exemplary user interface 210 includes a list 212 of one or more data items that can be individually selected for password protection. As illustrated in FIG. 2A, the data items provided in the list 212 are not password protected. FIG. 2A illustrates that a first data item 230 "Medical ID+Health Insurance" is selected from the list 212. Upon selection of the data item 230, the computing device 110 can provide a preview of the data item 230 on a preview screen 214 of the user interface 210. In some embodiments, the data item can include secondary information 216, e.g., a time at which the data item was created and/or last modified. In another example, the secondary information 216 can include a preview of the content of the data item. As shown in FIG. 2A, the preview screen 214 can include an action icon 220. Selection of the action icon 220 can cause the application 120 to perform a number of different functions. For example, selecting the action icon 220 can cause the application 120 to display a user interface (not illustrated in FIG. 2A) that enables a user to select from options that include: "Copy," "Print," and "Password Protect Note". As illustrated in FIGS. 2A-2B, the option to "Password Protect Note" is selected. In turn, the application 120 can provide a prompt to the user to enter a password to be associated with the selected data item.

FIG. 2B illustrates an exemplary user interface 210 for password protecting the selected data item. As shown in FIG. 2B, the user interface 210 can be updated to include an entry box 240 for entering a password. After receiving the password (e.g., by way of a virtual keyboard 252) via the entry box 240, the user can be prompted to verify the password via an entry box 242. After receiving the verification for the password via the entry box 242, the application 120 can also receive a request to associate a secondary authentication factor with the data item via a toggle 250 to turn on/off the secondary authentication factor. By adjusting the state of the toggle 250, the application 120 can associate the secondary authentication factor with the selected data item. By way of example, the secondary authentication factor can include at least one of a fingerprint recognition, facial recognition, gesture pattern recognition, secondary passcode, and the like. After validating the inputs, the application 120 can associate the password with the selected data item. Additionally, the application 120 can establish a secured user session that enables the user to password protect additional unprotected data items without re-entering the password, as well as view other data items that are protected in association with the password.

Figure 3A:
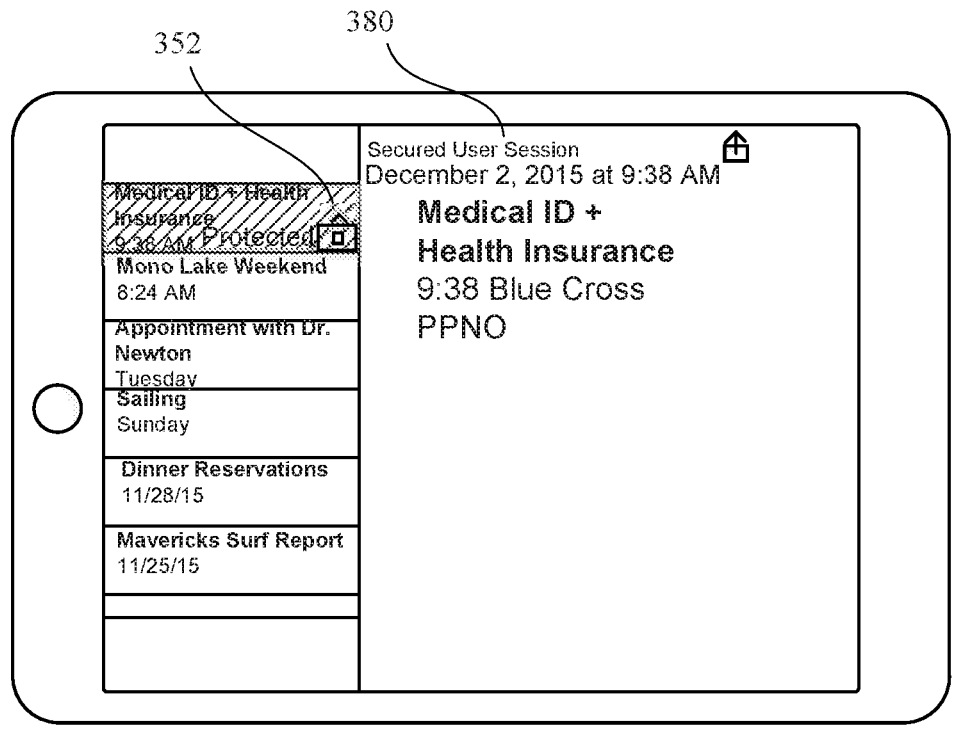
FIGS. 3A-B illustrate an example user interface, according to some embodiments.
Figure 3B:
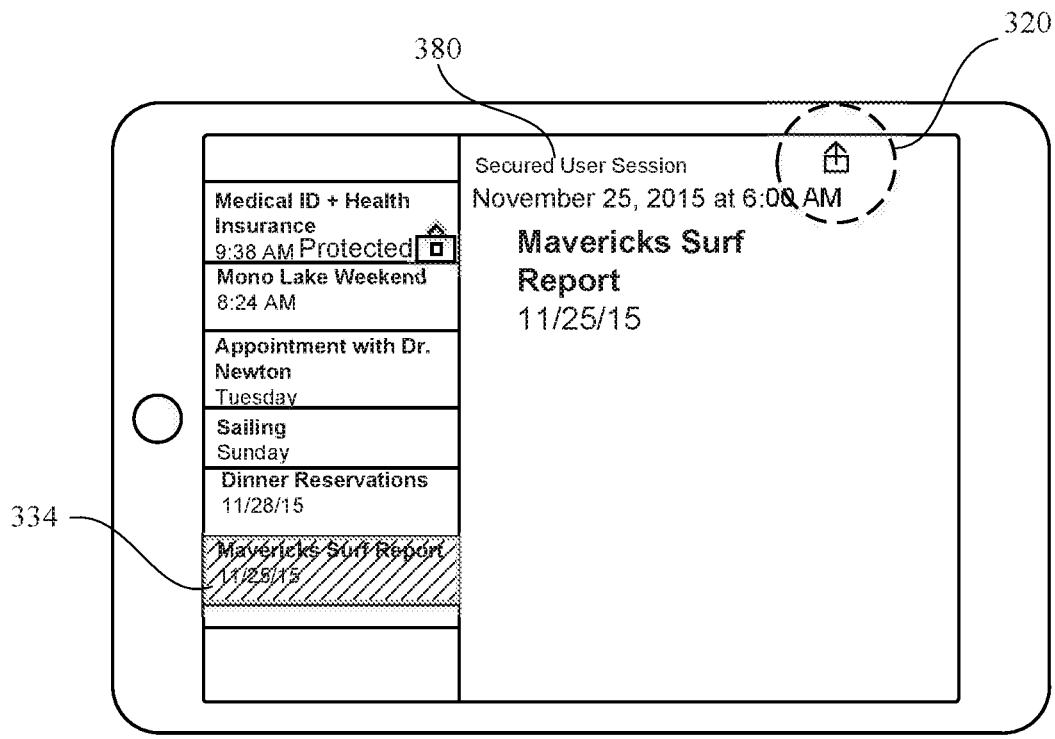

FIG. 3A illustrates an exemplary user interface 310 for indicating that the data item described above in conjunction with FIGS. 2A-2B is password protected. In particular, the user interface 310 can provide an indication that the data item is password protected via an icon 352. Moreover, the application 120 can provide an indication that a secured user session is active by way of an icon 380. Turning now to FIG. 3B, the secured user session remains active, as indicated by the icon 380. Subsequently, the application 120 receives a request (e.g., by way of an action icon 320) to password protect a second data item 334, labeled "Mavericks Surf Report", and the application 120 can provide a preview of the data item 334 in the preview window 316. Accordingly, as the secured user session remains active, the application 120 can password protect the data item 334 without prompting for the password/secondary authentication factor provided in conjunction with FIGS. 2A-2B. In this manner, so long as the secured user session remains active, the application 120 can process subsequent requests to password protect other data items without requiring credential input from the user. According to some embodiments, the secured user session remains active until the occurrence of at least one of a pre-established period of time has passed, a logout of the secured user session has occurred, and the like.

Figure 4:
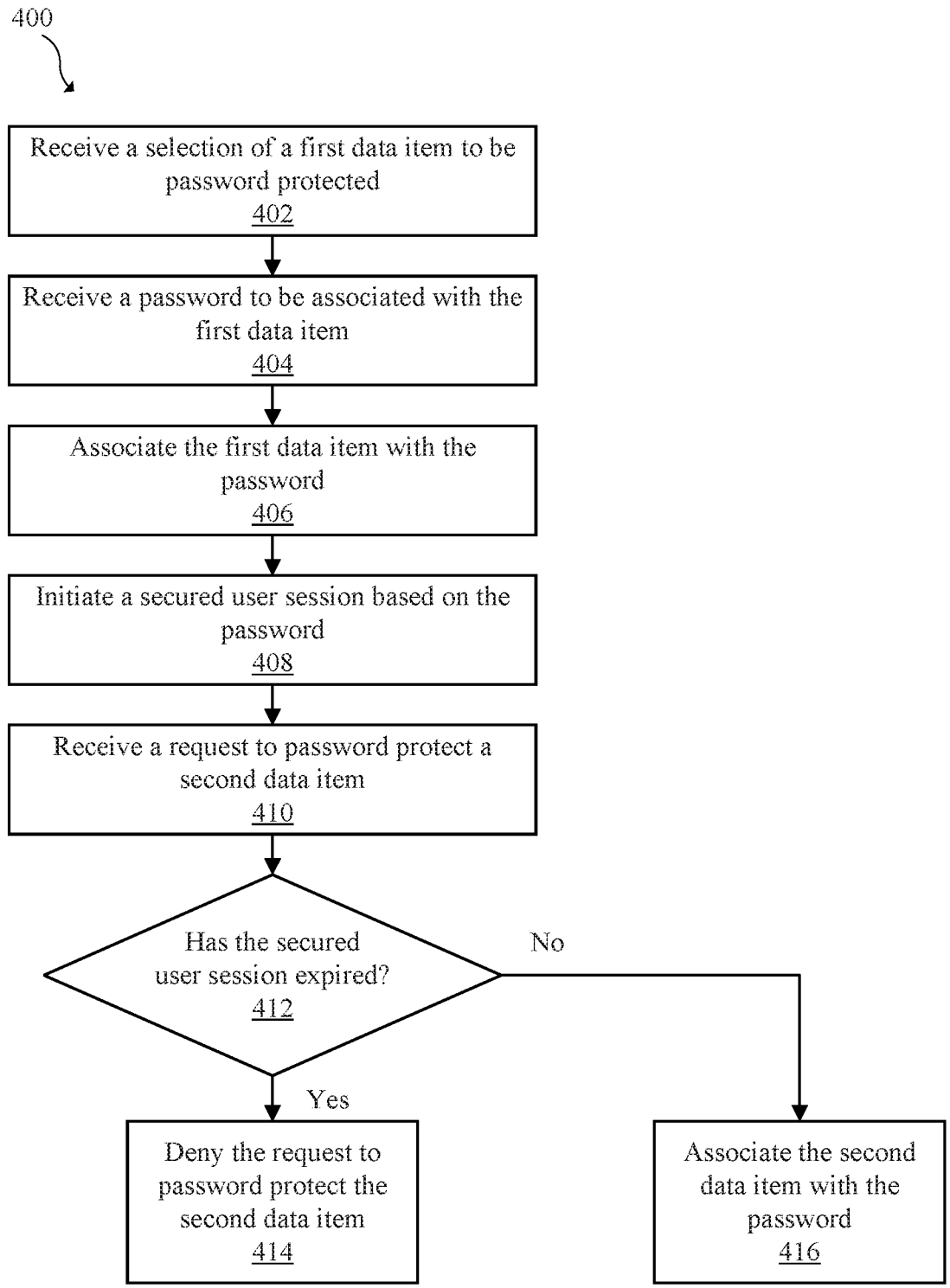
FIG. 4 illustrates a method for password protecting a data item, according to some embodiments.

FIG. 4 illustrates a method 400 for password protecting a first data item and enabling a secured user session, according to some embodiments. As shown, the method 400 begins at step 402, where an application 120 receives a selection of a first data item to be password protected. In some embodiments, the request for password protection can be initiated by a user of the application 120. According to one example, the data item can represent a note provided by an application, such as Apple Notes®. According to other examples, the data item can represent an e-mail, a word processing document, a drawing, mathematical calculation/equations, a programming script, and the like. In response to receiving a selection of the first data item to be password protected, the application 120 can prompt for a password to be entered. In response to receiving the password at step 404, the application 120 can associate the password with the selected data item at step 406. According to some embodiments, associating the password with the selected data item can refer to encrypting the data item. Subsequent to associating the password with the selected data item, the application 120 can initiate a secured user session at step 408.

In some embodiments, the application 120 can receive a request to password protect a second data item at step 410. In response, the application 120 can determine whether the secured user session remains active or whether the secured user session has expired at step 412. In some examples, the secured user session remains active until the occurrence of at least one of a pre-established period of time has passed. For example, the security daemon 140 can dictate that the secured user session can only remain active for 5 minutes. After 5 minutes have passed, the secured user session will expire. In other examples, the secured user session will expire upon the application 120 detecting an absence of user input to the application 120 that exceeds a threshold period of time. Upon determining that the secured user session has expired, the application 120 can deny the request to provide password protection for the second data item as indicated by step 414, whereupon the user is required to re-enter the password.

Alternatively, the application 120 can associate the second data item with the established password (common to the first data item) when it is determined that the secured user session remains active, as indicated by step 416. In this manner, by establishing password protection for a particular data item, the application 120 can automatically associate the established password for all other unprotected data items as long as a secured user session remains active.

Figure 5:
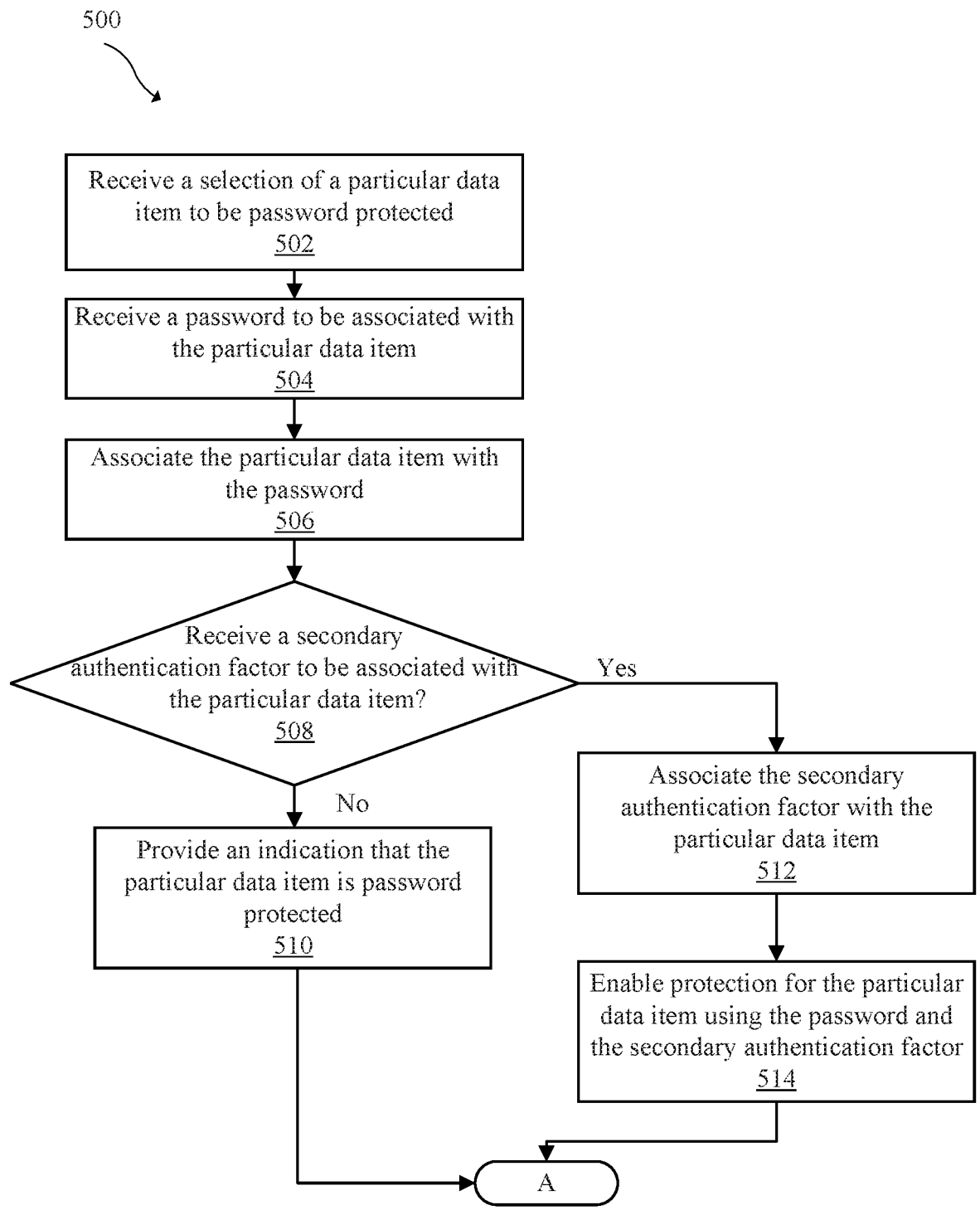
FIG. 5 illustrates a method for securing secondary authentication factor protection for a data item, according to some embodiments.

FIG. 5 illustrates a method 500 for associating a secondary authentication factor with a data item according to some embodiments. In some embodiments, the secondary authentication factor can be associated with the data item concurrently while associating the data item with the password during the password setup process. In other embodiments, the secondary authentication factor can be associated with the data item after the data item has been password protected. In other embodiments, the secondary authentication factor can be provided on either an individual data item basis or a global basis (i.e., providing secondary authentication factor for multiple data items simultaneously).

As shown, the method 500 begins at step 502, where the application 120 receives a selection of a particular data item to be password protected. In response, the application 120 can prompt the user for a password to be entered. In response to receiving the password at step 504, the application 120 can associate the password with the selected data item at step 506. During the step of associating the password with the selected data item, the application 120 can receive a request to associate the selected data item with a secondary authentication factor. In other embodiments, the application 120 can subsequently receive the request to associate the selected data item with the secondary authentication factor after the password has been associated with the selected data item. The application 120 can determine whether a request to associate the secondary authentication factor with the selected data item has been received at step 508.

The secondary authentication factor refers to an additional layer of protection for encrypting the selected data item. In some examples, the secondary authentication factor can include a fingerprint pattern, a secondary pass code, a facial recognition, a gesture pattern recognition. In these examples, the application 120 can enable secondary authentication factors by communicating with additional hardware components on the computing device 110 such as a camera, a fingerprint scanner, or a tactile sensitive display. By establishing secondary authentication factor protection for a particular data item, the application 120 can automatically associate the established secondary authentication factor for all other unprotected data items. In other words, the secondary authentication factor can serve as a substitute for the established password when the secured user session has expired.

At step 510, the application 120 can determine that a secondary authentication factor is not to be associated with the particular data item, whereupon the method 500 proceeds to step 602 of FIG. 6, described below in greater detail. Alternatively, at step 512, the application 120 can determine that a secondary authentication factor is received and proceed to associate the secondary authentication factor with the selected data item. Accordingly, the selected data item can be protected by both the password and the secondary authentication factor as indicated by step 514. In turn, the method 500 can proceed to step 602 of FIG. 6.

Figure 6:
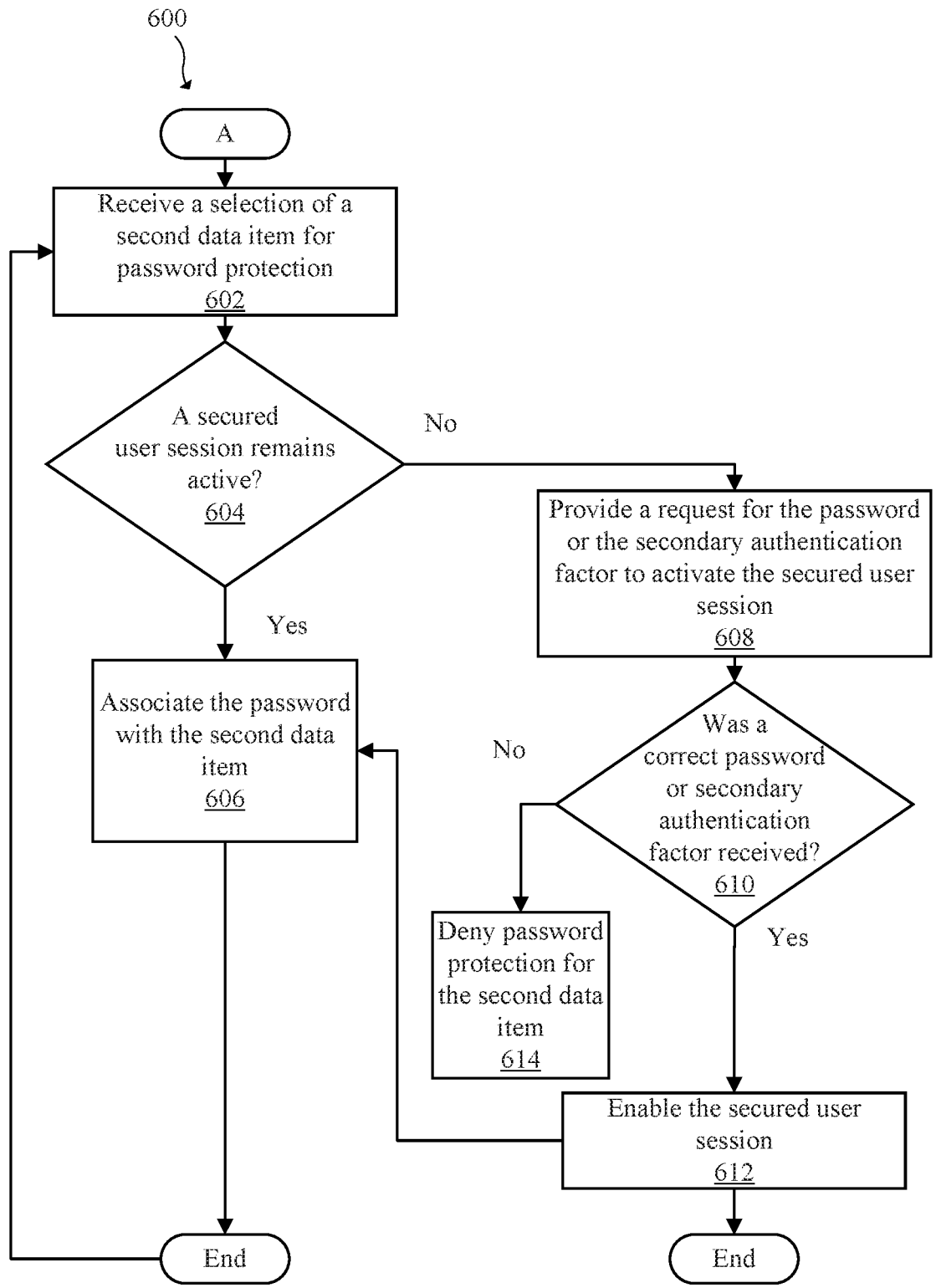
FIG. 6 illustrates a method for password protecting a data item, according to some embodiments.

FIG. 6 illustrates a method 600 that extends the method 500 described above in conjunction with FIG. 5. The method 600 involves password protecting a second data item in accordance with a secured user session remaining active. In some embodiments, the method 600 can occur immediately following the step of initiating a secured user session (e.g., FIG. 4). In other embodiments, the method 600 can occur after an elapsed period of time has passed following the initiation of the secured user session. As shown in FIG. 6, the method 600 begins at step 602, where the application 120 receives a selection of a second data item for password protection. Upon receiving the selection of the second data item, the application 120 can determine whether the secured user session remains active at step 604. If the application 120 determines that the secured user session remains active, then the application 120 can associate the second data item with the same password established for the first data item (see e.g., FIG. 4) at step 606.

Alternatively, upon determining that the secured user session is no longer active, the application 120 can prompt the user to provide credentials necessary to initiate the secured user session. For example, the application 120 can request at least one of the password or the secondary authentication factor to activate the secured user session at step 608. At step 610, the application 120 can determine whether the password or the secondary authentication factor matches the established password or secondary authentication factor that was provided during the setup process (e.g., FIG. 4). If neither the password nor secondary authentication matches, then the application 120 can deny password protection for the second data item at step 614. Alternatively, if the application 120 determines that the correct password or secondary authentication factor was received, then the application 120 can activate the secured user session at step 612. Subsequently, the second data item can be associated with the password/the secondary authentication factor at step 606.

Figure 7:
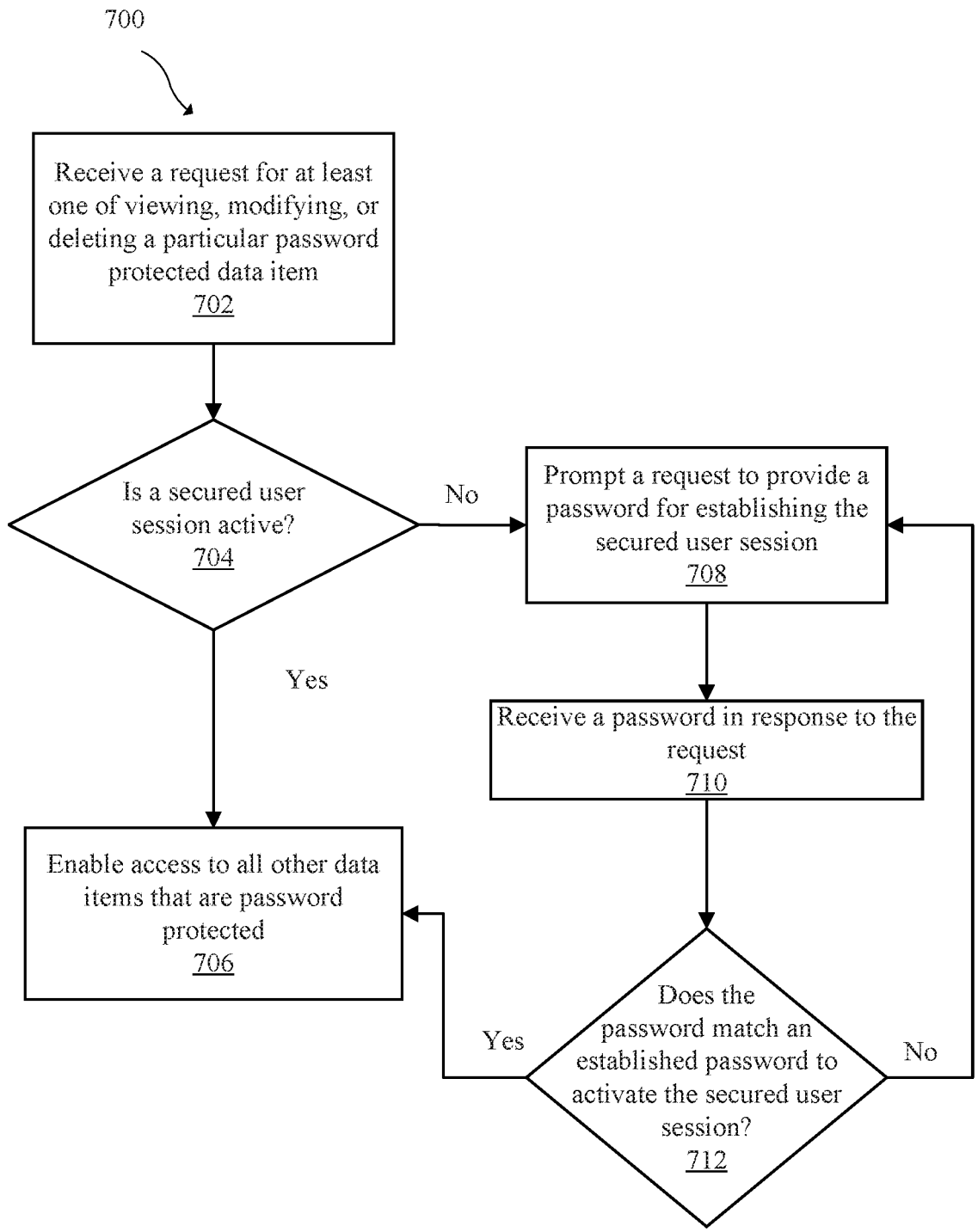
FIG. 7 illustrates a method for accessing a password protected data item, according to some embodiments.

FIG. 7 illustrates a method 700 for performing at least one of viewing, modifying, or deleting a password protected data item, according to some embodiments. As shown in FIG. 7, the method 700 begins at step 702, where the application 120 receives a request to access a particular password protected data item. Upon receiving the request for access to the password protected data item, the application 120 can determine whether the secured user session remains active at step 704. If the application 120 determines that the secured user session remains active, then the application 120 can enable access to all other password protected data items at step 706. Enabling access to all other password protected data items during the secured user session can include at least one of viewing, modifying, or deleting the password protected data items. Alternatively, if the application 120 determines that the secured user session is no longer active, the application 120 prompts a request to the user to provide a password or a secondary authentication factor to establish the secured user session at step 708.

In some embodiments, the application 120 can differentiate between old and current passwords. For example, if the application 120 receives an old or expired password in response to the request to provide a current password to establish the secured user session, then the application 120 can deny access to the password protected data item. In some embodiments, a security daemon 140 can facilitate in determining whether an old or expired password has been received.

At step 710, upon receiving a password from the user, the application 120 can determine whether the password matches the established password. Upon determining that the password matches the established password, the application 120 can enable access to all data items stored within the database at step 712, including both unprotected and password protected data items. Alternatively, if the application 120 determines that the password does not match the established password, then the application 120 can prompt the user to provide the secondary authentication factor. As discussed above, the secondary authentication factor can serve as a substitute for the established password in order to re-activate the secured user session. In some embodiments, upon a repeated number of failed attempts to enter the correct password or secondary authentication factor, the application 120 can lock the user from attempting to access one or more of the password protected data items or provide a request to the user for a new password, the details of which are described below in conjunction with FIG. 8.

Figure 8:
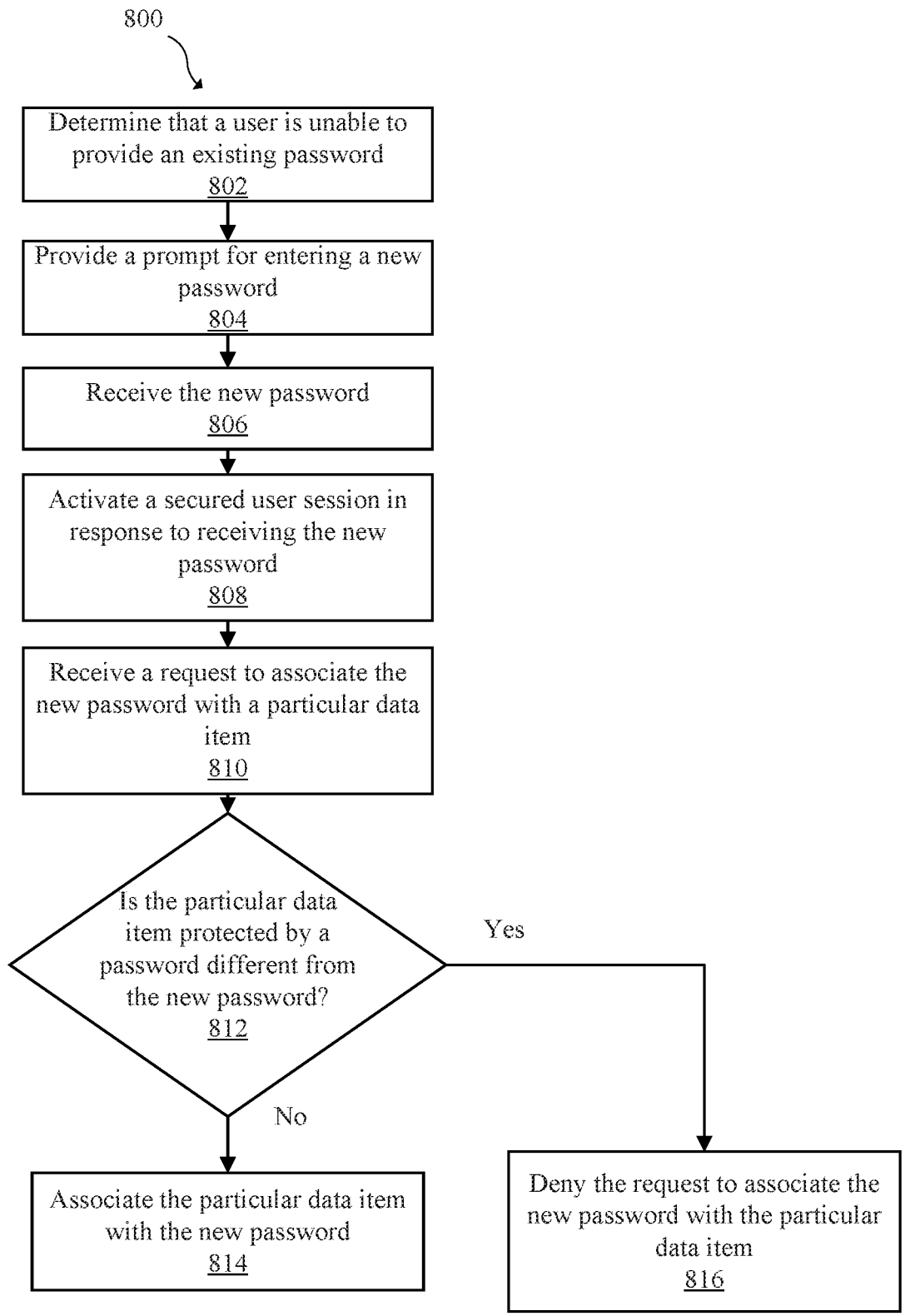
FIG. 8 illustrates a method for changing a password, according to some embodiments.

FIG. 8 illustrates a method 800 for changing a password when an existing password is forgotten, according to some embodiments. As shown in FIG. 8, the method 800 begins at step 802, where the application 120 determines that the user is unable to provide the existing password. In some embodiments, the user can prompt the application 120 for a request to enter a new password at step 804. In another embodiment, the application 120 can determine that the user has exceeded a predetermined number of attempts to enter the established password and provides a prompt for the user to enter a new password at step 804. Upon receiving the new password at step 806, the application 120 can activate a secured user session at step 808. At step 810, the application 120 can receive a request to associate a selected data item with the new password. At step 812, the application 120 determines whether the selected data item is already secured by a different password. If the selected data item is not already secured by a different password, then the application 120 secures the data item with the new password at step 814. Otherwise, the application 120 denies the request to associate the selected data item with the new password at step 816. It is noted that all data items protected with the existing (i.e., forgotten) password can no longer be accessed unless the user is able to present the existing (i.e., forgotten) password at a later time. In any case, all data items selected for protection are subsequently password protected using the new password, at least until an additional password is provided (e.g., as described below in conjunction with FIG. 9).

Figure 9:
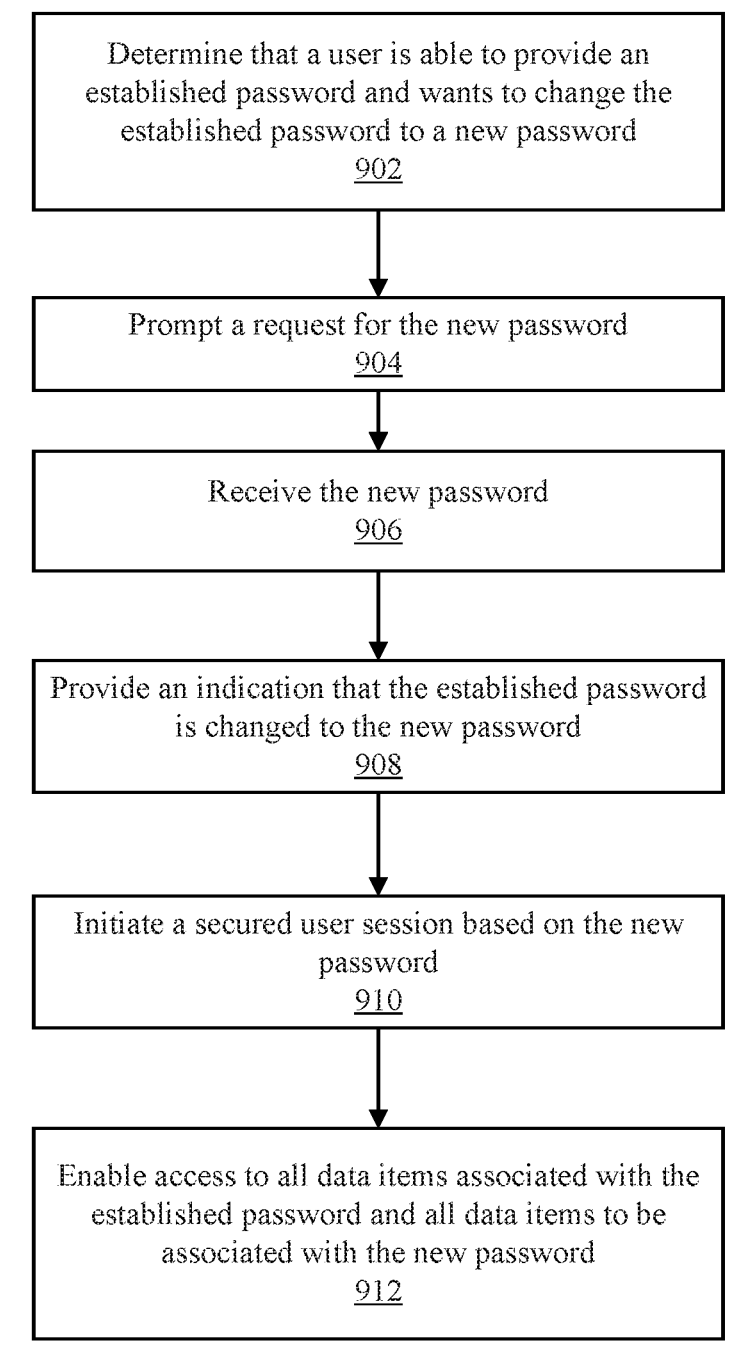
FIG. 9 illustrates a method for changing a password, according to some embodiments.

FIG. 9 illustrates a method 900 for changing an established password to a new password when a user is able to provide the established password. For example, the user may desire to change the established password as a precautionary measure. As shown in FIG. 9, the method 900 begins at step 902, where the application 120 determines that a user has provided the established password and requests to change the established password with a new password. Prior to step 902, the application 120 can receive the established password. At step 904, the application 120 can provide a prompt for a new password. In response to the request, the user can provide a new password to be received by the application 120 at step 906.

Upon receiving the new password, the new password can be utilized to encrypt the established password, such that the established password remains accessible to the application 120 and enables the application 120 to access data items that were password protected using the established password. Accordingly, at step 908, the application 120 can provide an indication to the user that the established password is being changed to the new password. It is noted that changing the established password to the new password causes the application 120 to associate all password protected data items that were previously associated with the established password with the new password. At step 910, changing the established password to the new password can result in initiating a secured user session based on the new password. At step 912, the application 120 can enable the user to access all password protected data items that were previously associated with the established password as well as all data items that are subsequently associated with the new password (so long as a secured user session is active).

Figure 10:
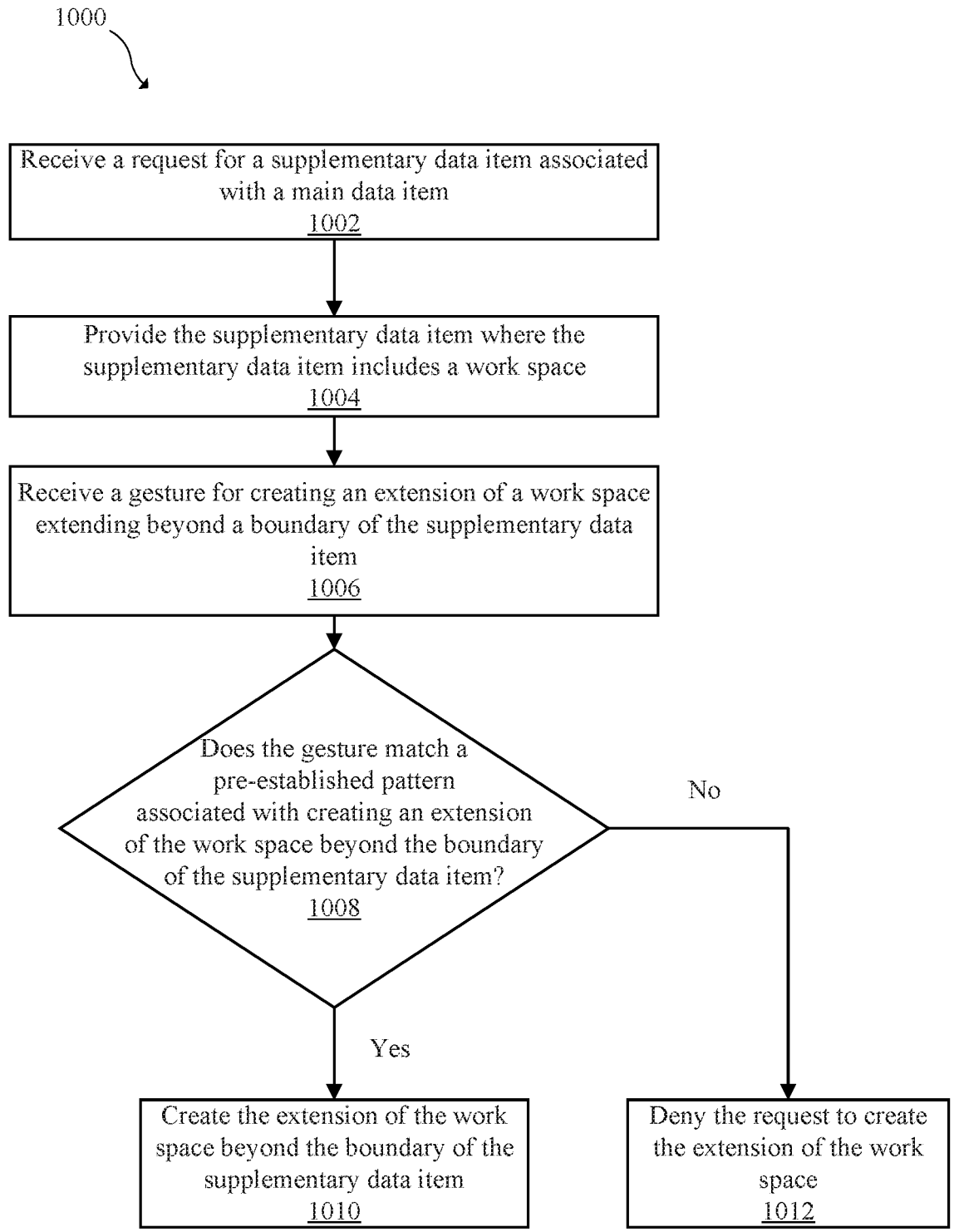
FIG. 10 illustrates a method for creating an extension of a work space for a data item, according to some embodiments.

FIG. 10 illustrates a method 1000 for creating an extension of a work space associated with a supplementary data item belonging to a main data item, according to some embodiments. As shown in FIG. 10, the method 1000 begins at step 1002, where the application 120 receives a request for a supplementary data item associated with a main data item. The request can be issued by user (via a user interface provided by the application 120) in response to the user browsing through one or more main data items and selecting the main data item.

According to one example, the main data item can refer to a note provided by an application, such as Apple Notes®. In some examples, the supplementary data item can refer to a sketch included within the note. At step 1004, the application 120 provides the supplementary data item in response to the request. In some embodiments, the supplementary data item can include a work space, which refers to portion of a user interface of the application 120 where the user is permitted to create, modify, or delete a portion of the supplementary data item. In some embodiments, the work space can include visible boundaries to help the user perceive the confines of the work space.

At step 1006, the application 120 receives a gesture input by the user. The gesture can be provided by the user with the intent to cause the application 120 to create an extension of the existing work space such that the work space extends beyond the visible boundaries of the supplementary data item. For example, FIG. 11C illustrates an exemplary user interface having a work space 1172 extending beyond the confines of the non-extended work space 1172 as provided by a visual boundary 1120 (see FIG. 11B). In some examples, the provided gesture can be detected by the application 120 as a combination of one or more characteristics, including at least one of a horizontal swipe, a vertical swipe, a diagonal swipe, and the like. In some examples, the detected characteristics of the gesture can be interpreted by the application 120 as a swipe, a pinch, a single finger tap or drag, a scroll, a two finger drag, a three finger drag, a four finger drag, and the like. In some embodiments, the application 120 can recognize the specific gesture provided and additionally determine not just the type of gesture, but also a speed, an acceleration, a yaw rate of gesture, and a length of the gesture made. This list of different detected characteristics is not intended to be an exhaustive list, and can include any form of gesture that is capable of being input by the user.

At step 1008, the application 120 can determine whether the gesture indicates a request to extend the work space beyond the visible boundaries of the supplementary data item. When the application 120 determines that the gesture indicates a request to extend the work space beyond the visible boundaries of the supplementary data item, the application 120 can respond by creating an extension of the work space beyond the confines of the supplementary data item at step 1010. In some embodiments, characteristics of the gesture can affect the size and/or surface area of the extension of the work space created. For example, a gesture that is perceived to last for one second can result in creating a greater extension of the work space in comparison to a gesture that is perceived to last for half a second. In some embodiments, the extension of the work space can be so expansive that the resulting work space is perceived to be blank (or absent of content). In other embodiments, the resulting work space can include remnants of the previous media item included in the non-extended work space (e.g., element 1116 of FIG. 11A). In other embodiments, the extension of the work space can still include portions of the previous media item. In one example, a two finger swipe can cause the application 120 to create a different extension (e.g., a modification in surface area) of the work space in comparison to a one finger swipe.

Alternatively, at step 1012, the application 120 can determine that the gesture does not indicate a desire to extend the work space beyond the visual boundaries of the supplementary data item. When this occurs, the application 120 can deny the request to create an extension of the work space such that pre-existing work space is not affected.

Figure 11A:
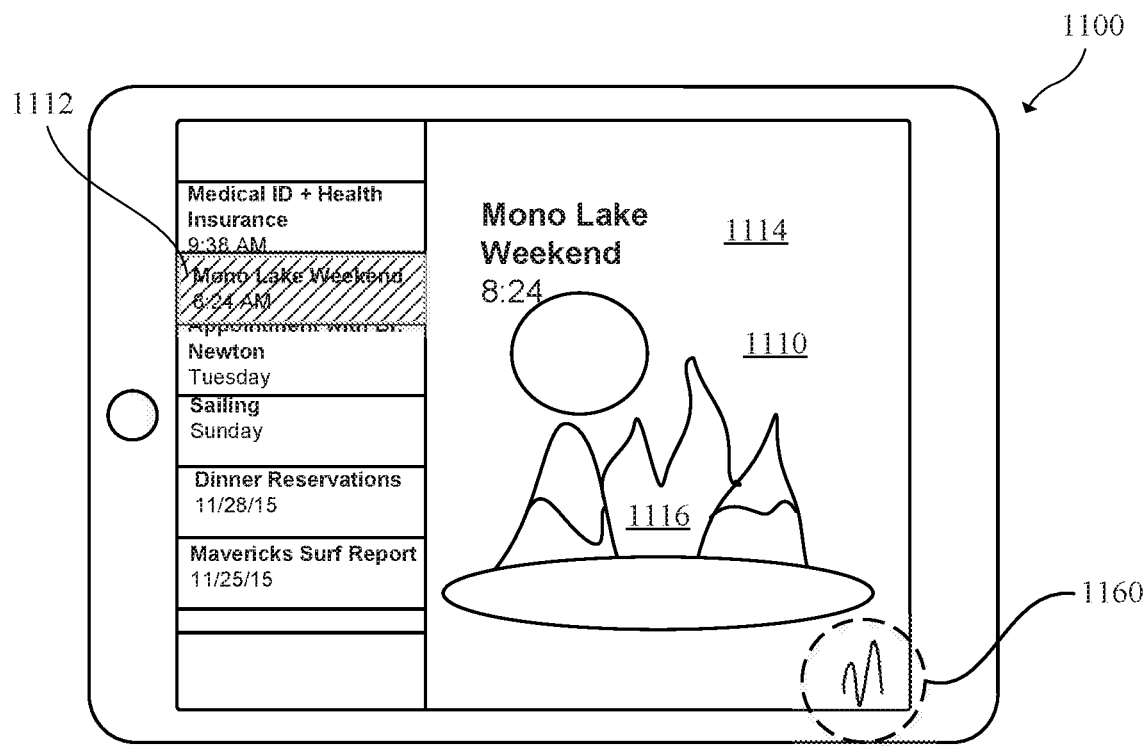
FIGS. 11A, 11B, 11C, and 11D illustrate a sequence diagram for creating an extension of a work space for a data item, according to some embodiments.
Figure 11B:
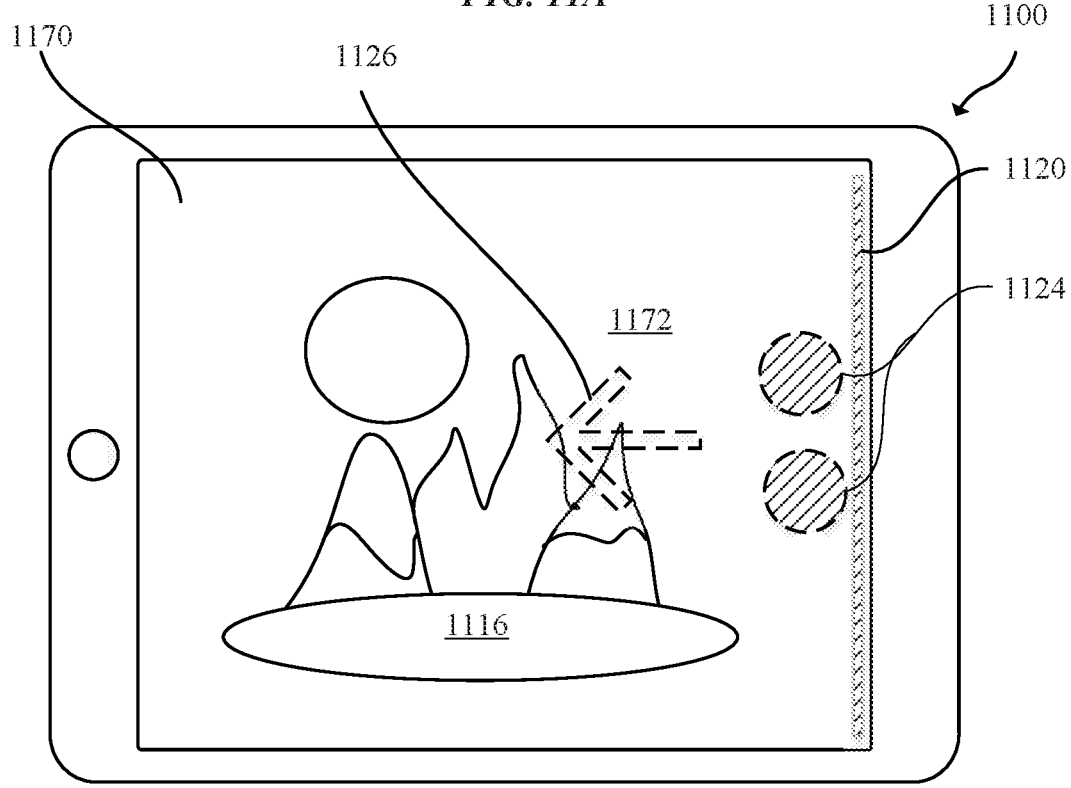
Figure 11C:
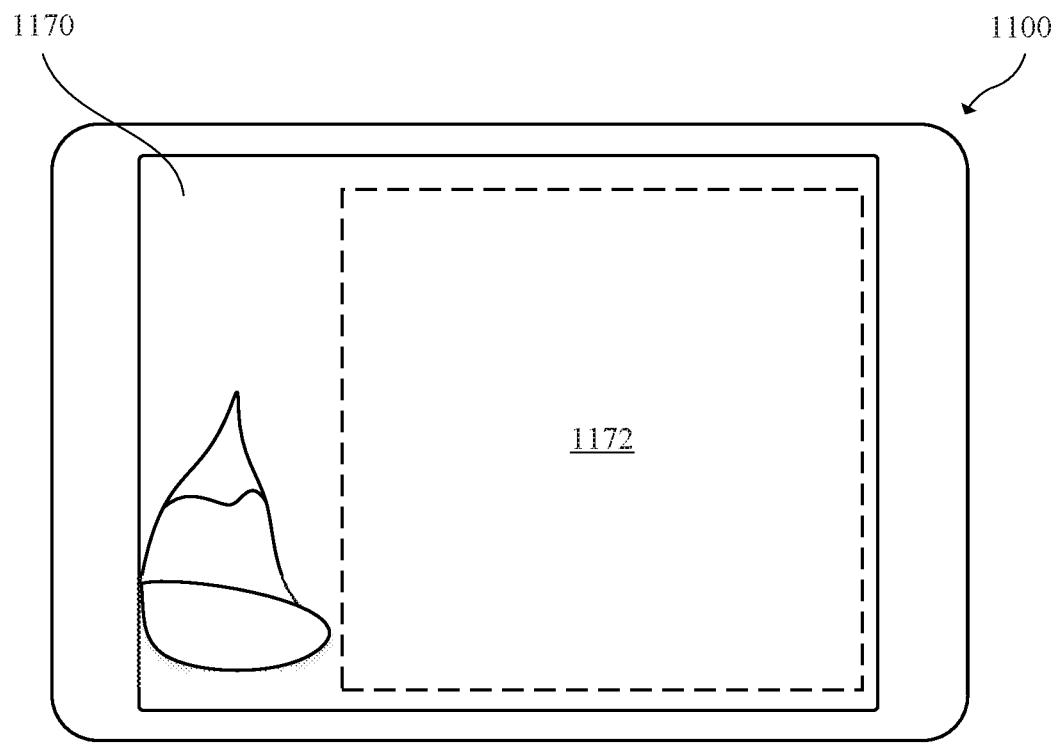

FIGS. 11A-11D illustrate a sequence diagram 1100 for creating an extension of a work space associated with a supplementary data item (of a main data item), as described above in the method 1000 in conjunction with FIG. 10. In particular, a user interface 1110 of the application 120 illustrated in FIG. 11A can be configured to receive a selection of a main data item. As shown in FIG. 11A, a main data item 1112 labeled "Mono Lake Weekend" is selected, which causes the application 120 to provide a preview window 1114 within the user interface 1110. In turn, the user can browse through content by way of the preview window 1114, e.g., the user can browse through existing sketches that are associated with a note. As shown in FIG. 11A, the main data item 1112 includes a supplementary data item 1116 (e.g., a sketch of a lake) provided within the preview window 1114 of the user interface 1110. According to some embodiments, the user interface 1110 can include an action icon 1160 that, when selected by a user, can cause the application 120 to substitute the preview window 1114 of the user interface 1110 with a supplementary data item window 1170, which is illustrated in FIG. 11B.

In some embodiments, the size of the supplementary data item 1116 can be enlarged within the supplementary data item window 1170 relative to the size of the supplementary data item 1116 provided within the preview window 1114, and different functions for creating, modifying, or deleting aspects of the supplementary data item can be provided (not illustrated). While displaying the supplementary data item, the application 120 can receive gesture-based input from the user. For example, as illustrated in FIG. 11B, a two finger swipe or pinch gesture 1124 can be provided on the right side of the non-extended work space 1172 and moving towards the left side of the non-extended work space (as illustrated by arrow 1126), where the work space 1172 can be defined by a visual boundary 1120 (as illustrated on the right side of the work space 1172). According to some embodiments, the application 120 can detect a gesture made on the non-extended work space 1172 and process different characteristics of the gesture, including the type of gesture, the speed of the gesture, the direction of the gesture, temporal aspects associated with the gesture, and the like. The application 120 can then determine whether the gesture corresponds to a request to create an extension of the work space 1172, which is described below in greater detail in conjunction with FIG. 11C.

Figure 11D:
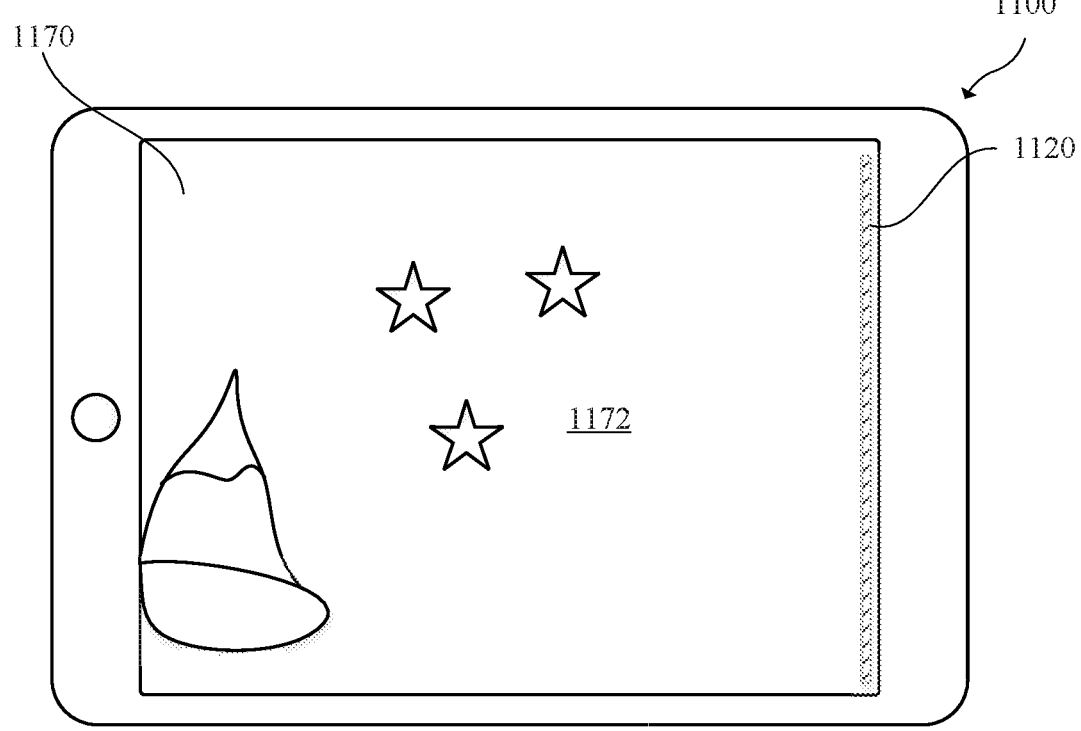

FIG. 11C illustrates a resulting exemplary interface as a result of the application 120 creating an extension of the non-extended work space 1172 of the supplementary data item. As shown in FIG. 11C, the supplementary data item window 1170 is updated to provide additional blank space in the form of the non-extended work space 1172. This blank space represents additional surface area for modifying the existing supplementary data item or creating a new supplementary data item. For example, FIG. 11D illustrates an exemplary interface where additional sketches have been provided in the blank space. As shown in FIG. 11D, the visual boundary 1120 provides a visual depiction of the modified confines of the work space 1172.

Accordingly, these steps of creating an extension of the work space of the supplementary data item can be repeated in order to provide any number of possibilities. For example, the extension of the work space can be increased in at least one of a lateral direction, a longitudinal direction, or diagonal direction. Moreover, the application 120 can be configured to provide an audible, tactile, vibratory, or visual cue on the supplementary data item window 1170 as confirmation that the work space 1172 has been modified in accordance with user input. Additionally, the surface area of the work space can also be reduced through a series of one or more gestures (instead of being extended).

Figure 12:
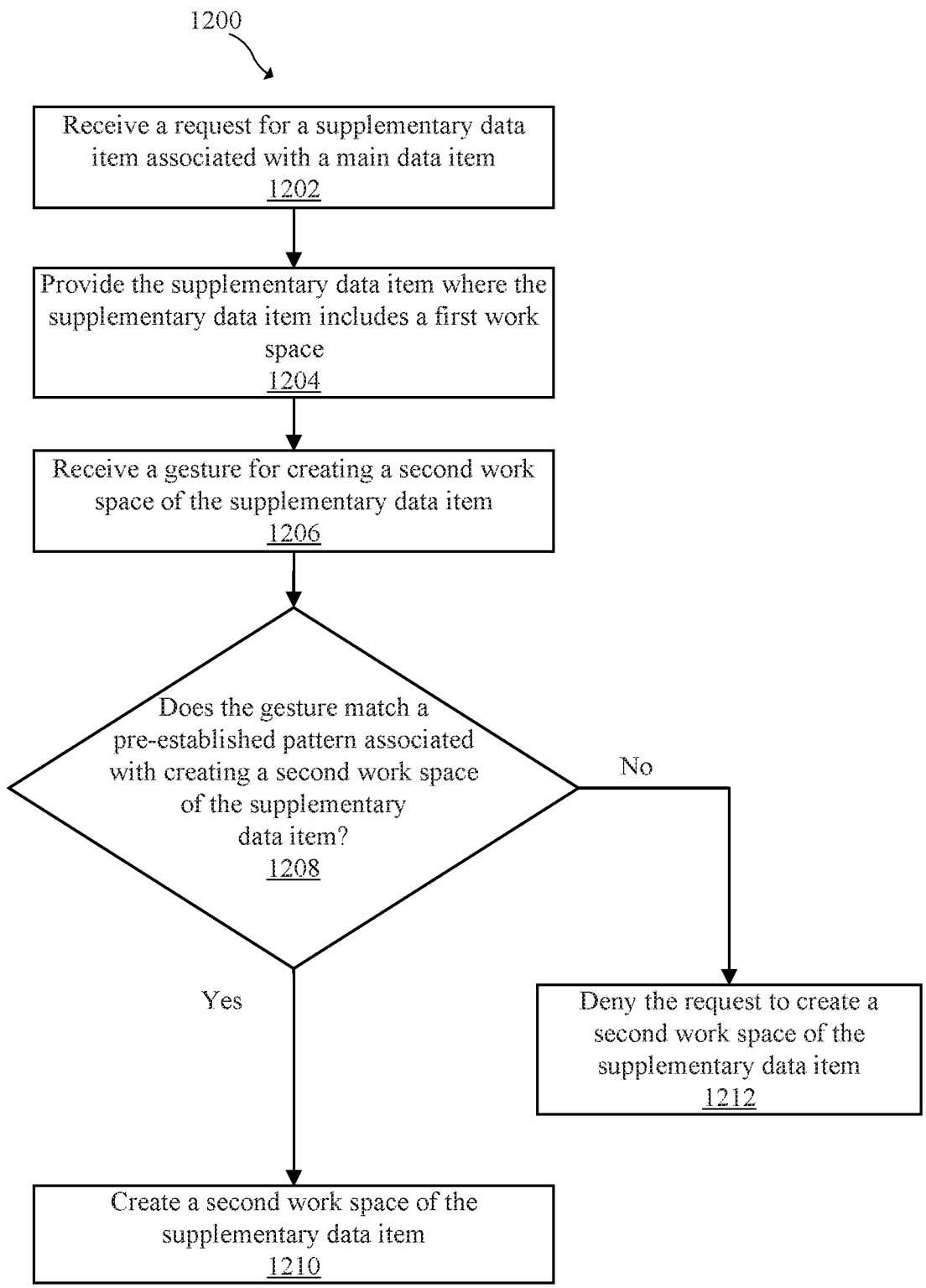
FIG. 12 illustrates a method for creating a new work space for a data item, according to some embodiments.

FIG. 12 illustrates a method 1200 for creating a work space associated with a supplementary data item belonging to a main data item, according to some embodiments. As shown in FIG. 12, the method 1200 begins at step 1202, where the application 120 receives a request for a supplementary data item associated with a main data item. The request can be issued by user (via a user interface provided by the application 120) in response to the user browsing through one or more main data items and selecting the main data item.

According to one example, the main data item can refer to a note provided by an application, such as Apple Notes®. In some examples, the supplementary data item can refer to a sketch included within the note. At step 1204, the application 120 provides the supplementary data item in response to the request. In some embodiments, the supplementary data item can include a work space, which refers to portion of a user interface of the application 120 where the user is permitted to create, modify, or delete a portion of the supplementary data item. In some embodiments, the work space can include visible boundaries to help the user perceive the confines of the work space.

At step 1206, the application 120 receives a gesture input by the user. The gesture can be provided by the user with the intent to cause the application 120 to create an additional work space such that the resulting additional work space does not share (or overlap) with any portion of the previous work space of the supplementary data item. For example, FIG. 13B illustrates an exemplary user interface having a new work space 1374 as provided by a visual boundary 1320 (see FIG. 13B), which does not overlap with any portion of the previous work space (e.g., element 1372 of FIG. 13A). In some examples, the provided gesture can be detected by the application 120 as a combination of one or more characteristics, including at least one of a horizontal swipe, a vertical swipe, a diagonal swipe, and the like. In some examples, the detected characteristics of the gesture can be interpreted by the application 120 as a swipe, pinch, a single finger tap or drag, a scroll, a two finger drag, a three finger drag, a four finger drag, and the like. In some embodiments, the application 120 can recognize the specific gesture provided and additionally determine not just the type of gesture, but also a speed, an acceleration, a yaw rate of gesture, and a length of the gesture made. This list of different detected characteristics is not intended to be an exhaustive list, and can include any form of gesture that is capable of being input by the user.

At step 1208, the application 120 can determine whether the gesture indicates a request to create an additional work space of the supplementary data item. When the application 120 determines that the gesture indicates a request to create an additional work space of the supplementary data item, the application 120 can respond by creating an additional work space of the supplementary data item at step 1210. In some embodiments, characteristics of the gesture can affect the size and/or surface area of the extension of the work space created. For example, a gesture that is perceived to last for one second can result in creating an additional work space having a greater surface area in comparison to an additional work space that is created by a gesture that is perceived to last for half a second. In one example, a three finger swipe can cause the application 120 to create a different type of work space (e.g., a modification in surface area) of the work space in comparison to an additional work space caused by a four finger swipe.

Alternatively, at step 1212, the application 120 can determine that the gesture does not indicate a desire to create an additional work space of the supplementary data item. When this occurs, the application 120 can deny the request to create the additional work space such that supplementary data item is not affected.

Figure 13A:
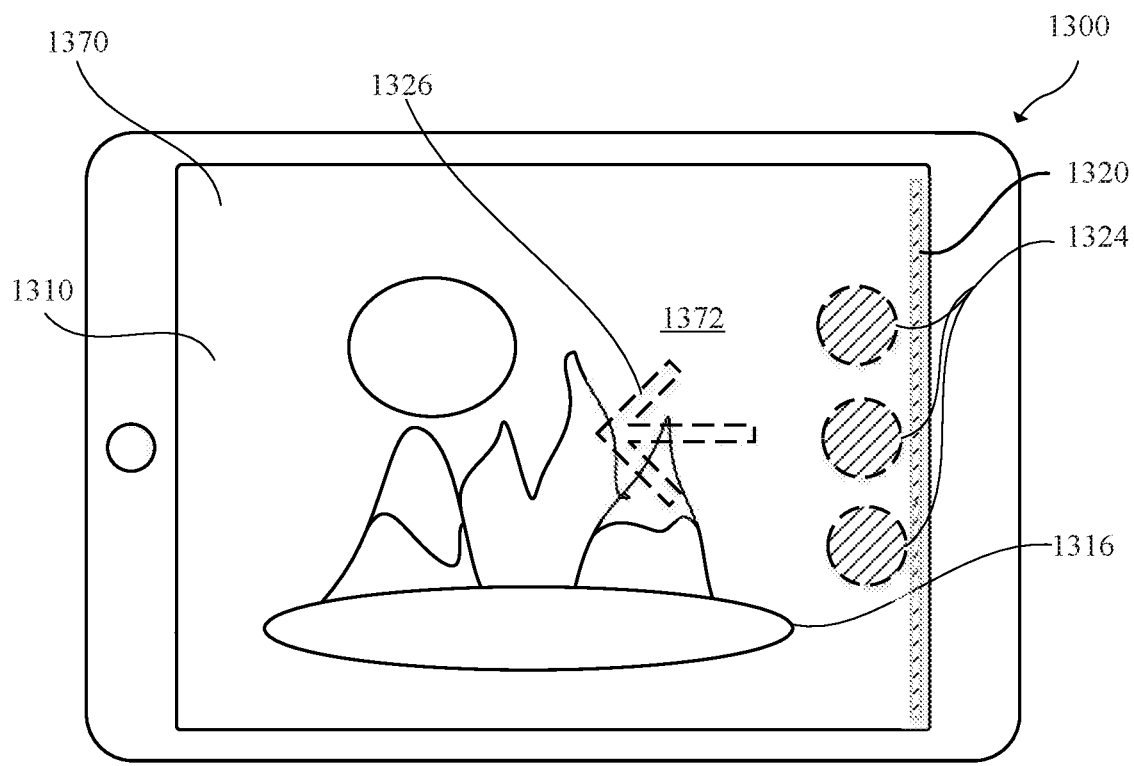
FIGS. 13A-B illustrates a sequence diagram for creating a new work space for a data item, according to some embodiments.
Figure 13B:
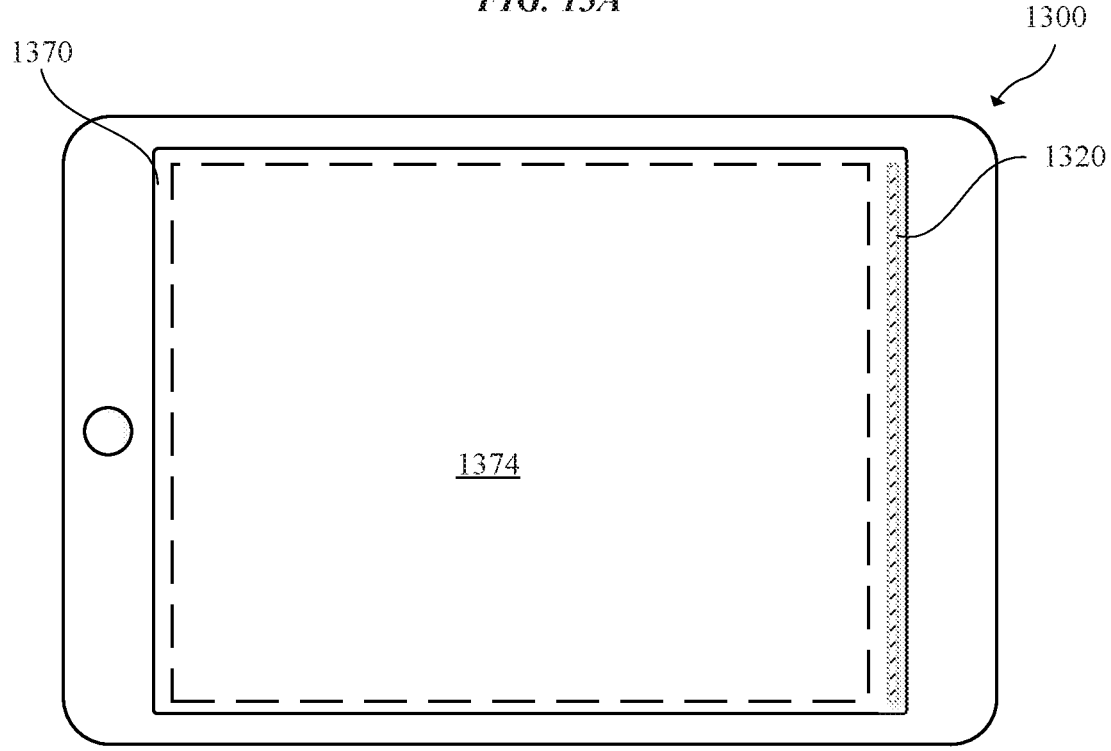

FIGS. 13A-13B illustrate a sequence diagram 1300 for creating an additional work space associated with a supplementary data item (of a main data item), as described above in the method 1200 in conjunction with FIG. 12. In particular, a user interface 1310 of the application 120 illustrated in FIG. 13A can be configured to receive a gesture-based input from the user. As shown in FIG. 13A, the supplementary data window 1370 illustrates a supplementary data item 1316 (e.g., a sketch of a lake) provided within a work space 1372.

While displaying the supplementary data item, the application 120 can receive a gesture-based input from the user. For example, as illustrated in FIG. 13A, a three finger swipe or pinch gesture 1324 can be provided on the right side of work space 1372 and move towards the left side of the work space (as illustrated by arrow 1326), where the work space 1372 can be defined by a visual boundary 1320 (as illustrated on the right side of the work space 1372). According to some embodiments, the application 120 can detect a gesture made on the work space 1372 and process different characteristics of the gesture, including the type of gesture, the speed of the gesture, the direction of the gesture, temporal aspects associated with the gesture, and the like.

The application 120 can then determine whether the gesture corresponds to a request to create an additional work space 1374, which is described below in greater detail in conjunction with FIG. 13B.

FIG. 13B illustrates a resulting exemplary interface as a result of the application 120 creating an additional work space 1374 of the supplementary data item. As shown in FIG. 13B, the supplementary data item window 1370 is updated to provide an increased amount of perceived blank space in the form of an additional work space 1374. This blank space represents an additional work space for creating a new supplementary data item. As shown in FIG. 13B, the visual boundary 1320 provides a visual depiction of the confines of the additional work space 1374.

Accordingly, these steps of creating an additional work space of the supplementary data item can be repeated in order to provide any number of possibilities. For example, the additional work space can be subsequently increased or decreased in at least one of a lateral direction, a longitudinal direction, or diagonal direction. Moreover, the application 120 can be configured to provide an audible, tactile, vibratory, or visual cue on the supplementary data item window 1370 as confirmation that the an additional work space 1374 is created in accordance with user input.

Figure 14:
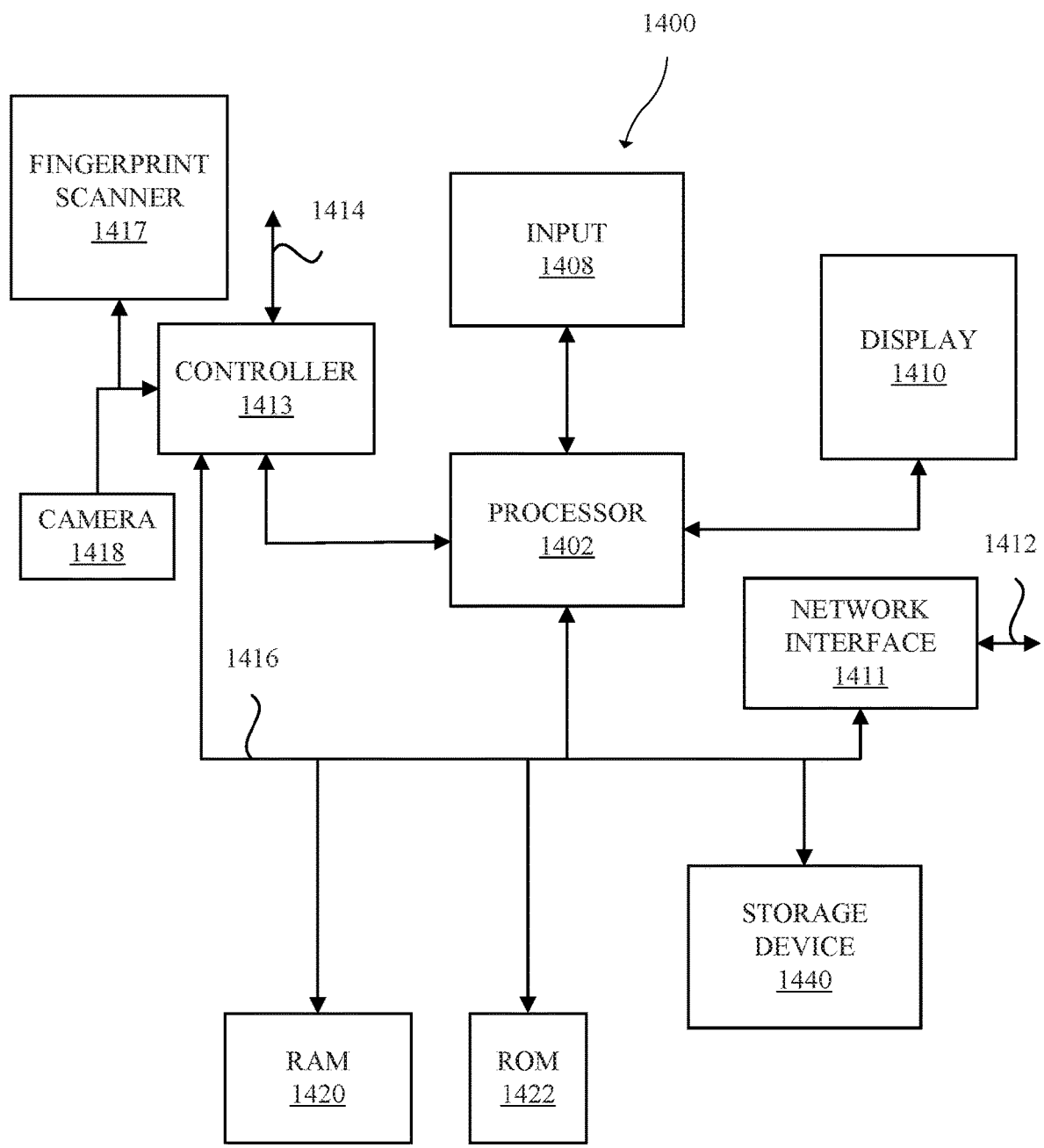
FIG. 14 illustrates a detailed view of a computing device that can be used to implement the various components described herein, according to some embodiments.

FIG. 14 illustrates a detailed view of a computing device 1400 that can be used to implement the various components described herein, according to some embodiments. In particular, the detailed view illustrates various components that can be included in the computing device 110 or the server 150 illustrated in FIG. 1. As shown in FIG. 14, the computing device 1400 can include a processor 1402 that represents a microprocessor or controller 1413 for controlling the overall operation of computing device 1400. The computing device 1400 can also include a user input device 1408 that allows a user of the computing device 1400 to interact with the computing device 1400. For example, the user input device 1408 can take a variety of forms, such as a button, keypad, dial, touch screen, audio input interface, visual/image capture input interface, input in the form of sensor data, etc. Still further, the computing device 1400 can include a display 1410 (screen display) that can be controlled by the processor 1402 to display information to the user. A data bus 1416 can facilitate data transfer between at least a storage device 1440, the processor 1402, and a controller 1413. The controller 1413 can be used to interface with and control different equipment through and equipment control bus 1414. The computing device 1400 can also include a network/bus interface 1411 that couples to a data link 1412. In the case of a wireless connection, the network/bus interface 1411 can include a wireless transceiver. The controller 1413 can also be configured to communicate with a fingerprint scanner 1417 and a camera 1418, such as for securing secondary authentication factor protection for the one or more password protected data items. (See e.g., FIG. 5).

The computing device 1400 also include a storage device 1440, which can comprise a single disk or multiple disks (e.g., hard drives), and includes a storage management module that manages one or more partitions within the storage device 1440. In some embodiments, the storage device 1440 can include flash memory, semiconductor (solid state) memory or the like. The computing device 1400 can also include a Random Access Memory (RAM) 1420 and a Read-Only Memory (ROM) 1422. The ROM 1422 can store programs, utilities or processes to be executed in a nonvolatile manner. The RAM 1420 can provide volatile data storage, and stores instructions related to the operation of the computing device 1400.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for password protecting a data item, the method comprising, at a computing device that is executing an application in a first unsecured user session:
    presenting, at a user interface of the computing device, one or more data items that are to be password protected;
    presenting, at the user interface, content associated with the one or more data items;
    receiving a first selection to password protect a first data item of the one or more data items, wherein the first data item includes a first content;
    receiving a password to be associated with the first data item;
    initiating a secured user session within the application by securing the first data item with the password, wherein, subsequent to securing the first data item with the password, at least a portion of the first content of the first data item is prevented from being presented at the user interface while the application is being executed in a second unsecured user session;
    receiving a second selection to password protect a second data item of the one or more data items; and
    in response to determining that the secured user session is active:
        password protecting the second data item with the password.

2. The method of claim 1, further comprising:
    receiving a request to associate a secondary authentication factor with the first data item;
    receiving the secondary authentication factor; and
    associating the first data item with the secondary authentication factor, wherein the secondary authentication factor enables access to the first content of the first data item.

3. The method of claim 2, further comprising:
    in response to determining that the secured user session is inactive:
        receiving a first request to activate the secured user session;
        prompting a second request for at least one of the password or the secondary authentication factor; and
        activating the secured user session when at least one of the password or secondary authentication factor is received.

4. The method of claim 3, further comprising:
    denying the first request to activate the secured user session when neither the password nor the secondary authentication factor is received.

5. The method of claim 4, further comprising:
    denying access to a second content of the second data item when the first request to activate the secured user session is denied.

6. The method of claim 2, wherein the secondary authentication factor is at least one of a user facial recognition, a user fingerprint recognition, a secondary passcode, or gesture a pattern recognition.

7. The method of claim 1, wherein the secured user session remains active until at least one of a pre-established period of time has passed, the secured user session becomes inactive, or the computing device is turned off.

8. The method of claim 1, wherein the first content is presented at the user interface while the application is being executed in the first unsecured user session.

9. The method of claim 1, further comprising:
    receiving a third request to password protect at least one unprotected data item while the secured user session remains active; and
    password protecting the at least one unprotected data item.

10. At least one non-transitory computer readable medium configured to store instructions that, in response to being executed by at least one processor included in a computing device, cause the computing device that is executing an application in a first unsecured user session to:
    present, at a user interface of the computing device, one or more data items that are to be password protected;
    present, at the user interface, content associated with the one or more data items;
    receive a first selection to password protect a first data item of the one or more data items, wherein the first data item includes a first content;
    receive a password to be associated with the first data item;
    initiate a secured user session within the application by securing the first data item with the password, wherein, subsequent to securing the first data item with the password, at least a portion of the first content of the first data item is prevented from being presented at the user interface while the application is being executed in a second unsecured user session;
    receive a second selection to password protect a second data item of the one or more data items; and
    in response to determining that the secured user session is active:
        password protect the second data item with the password.

11. The at least one non-transitory computer readable medium of claim 10, wherein the first content is presented at the user interface while the application is being executed in the first unsecured user session.

12. The at least one non-transitory computer readable medium of claim 10, wherein the at least one processor further causes the computing device to:
- receive a request to associate a secondary authentication factor with the first data item;
- receive the secondary authentication factor; and
- associate the first data item with the secondary authentication factor, wherein the secondary authentication factor enables access to the first content of the first data item.

13. A computing device configured to password protect data items, the computing device comprising:
- at least one processor; and
- at least one memory configured to store instructions that, in response to being executed by the at least one processor, cause the computing device that is executing an application in a first unsecured user session to:
  - present, at a user interface of the computing device, one or more data items that are to be password protected;
  - present, at the user interface, content associated with the one or more data items;
  - receive a first selection to password protect a first data item of the one or more data items, wherein the first data item includes a first content;
  - receive a password to be associated with the first data item;
  - initiate a secured user session within the application by securing the first data item with the password, wherein, subsequent to securing the first data item with the password, at least a portion of the first content of the first data item is prevented from being presented at the user interface while the application is being executed in a second unsecured user session;
  - receive a second selection to password protect a second data item of the one or more data items; and
  - in response to determining that the secured user session is active:
    - password protect the second data item with the password.

14. The computing device of claim 13, wherein, while the secured user session is active, the at least one processor further causes the computing device to:
- enable access to the first content of the first data item and a second content of the second data item.

15. The computing device of claim 14, wherein access to the first and second contents of the first data item and the second data item involves at least one of viewing, modifying, or deleting of the first and second contents.

16. The computing device of claim 13, wherein the at least one processor further causes the computing device to:
- receive a request to associate a secondary authentication factor with the first data item;
- receive the secondary authentication factor; and
- associate the first data item with the secondary authentication factor, wherein the secondary authentication factor enables access to the first content of the first data item.

17. The computing device of claim 16, wherein the at least one processor further causes the computing device to:
- in response to determining that the secured user session is inactive:
  - prompt a first request for at least one of the password or the secondary authentication factor; and
  - activate the secured user session when at least one of the password or the secondary authentication factor is received.

18. The computing device of claim 13, wherein the at least one processor further causes the computing device to:
- receive a second request to change the password associated with the first data item;
- receive a subsequent password;
- determine whether the subsequent password matches the password associated with the first data item; and
- in response to determining that the subsequent password does not match the password:
  - deny the second request to change the password.

19. The computing device of claim 18, wherein, in response to determining that the subsequent password matches the password, the at least one processor further causes the computing device to:
- provide a third request to receive a new password;
- receive the new password;
- associate the first data item with the new password; and
- establish a subsequent secured user session using the new password.

20. The computing device of claim 19, wherein the at least one processor further causes the computing device to:
- update the password with the new password.

* * * * *